May 8, 1951     T. E. CODY     2,551,997
FLIGHT DATA CALCULATOR FOR AIRPLANES
Filed Jan. 9, 1947     2 Sheets-Sheet 1
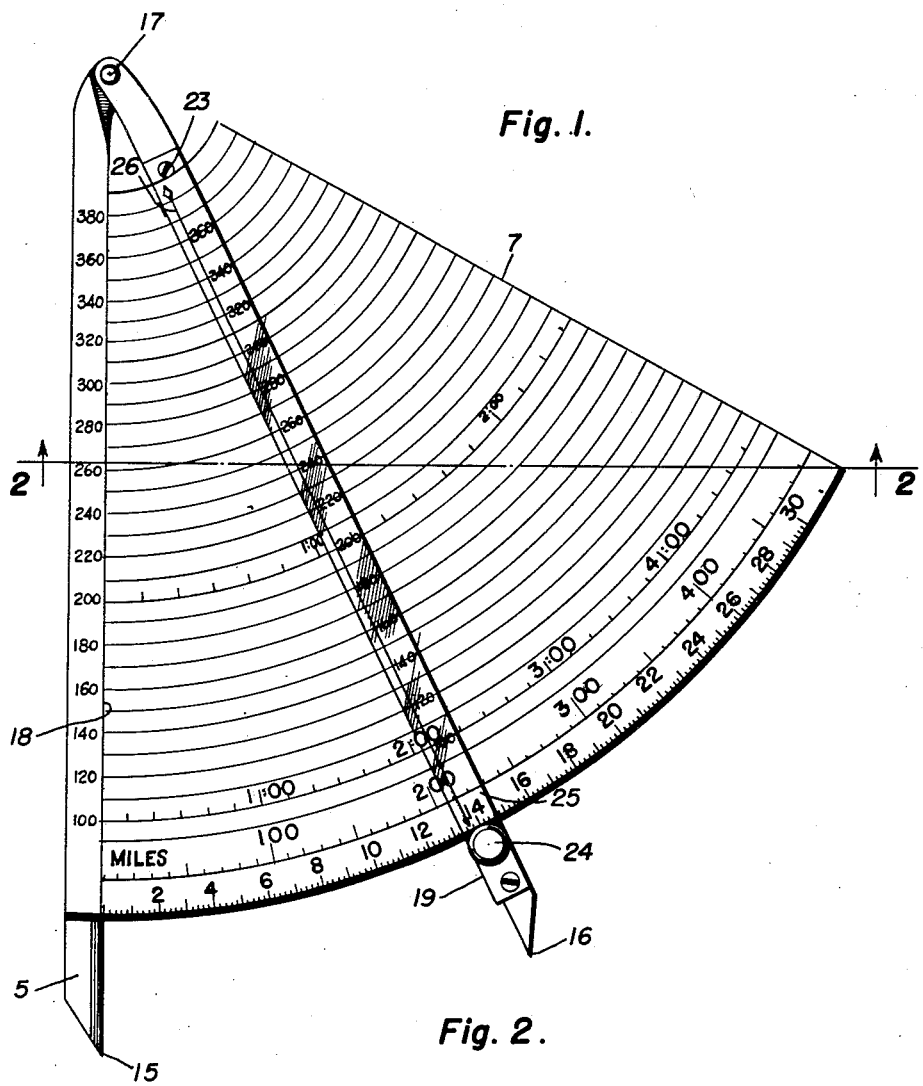
Fig. 1.
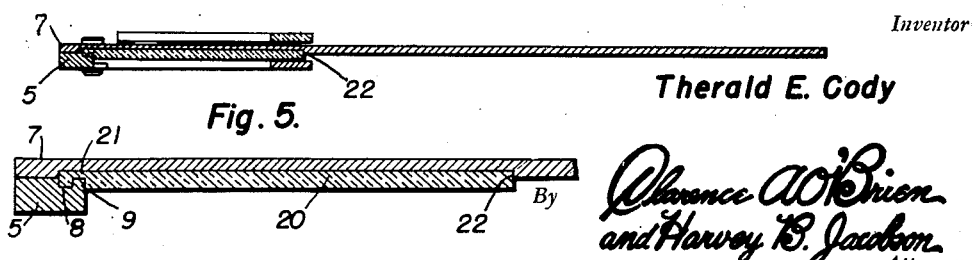
Fig. 2.
Fig. 5.
Inventor
Therald E. Cody
By Clarence A. O'Brien and Harvey B. Jacobson
Attorneys May 8, 1951     T. E. CODY     2,551,997
FLIGHT DATA CALCULATOR FOR AIRPLANES Filed Jan. 9, 1947     2 Sheets-Sheet 2

Inventor
Therald E. Cody

By *Clarence A. O'Brien and Harvey B. Jacobson*
Attorneys

Patented May 8, 1951

2,551,997

UNITED STATES PATENT OFFICE 2,551,997

FLIGHT DATA CALCULATOR FOR AIRPLANES

Therald E. Cody, Mansfield, Ohio

Application January 9, 1947, Serial No. 720,962

6 Claims. (Cl. 33—1)

This invention relates to navigational instruments and more specifically to calculators for computing flight data and it has for its general object to provide a simple instrument which can be handled and manipulated by pilots, operating without a navigator, during flight and which may also be of use to ground crews which have no navigational training.

It is a more specific object of the invention to replace the methods now in use involving either complex calculations or graphical determination of the required data, by methods which are simplified and rendered more or less automatic in their application through the use of a mechanical calculator specially adapted for this purpose.

A more specific object of the invention consists in providing an instrument which is based on a spacer permitting to take and measure distance and other data directly from the maps which serve navigational purposes.

A still further object of the invention consists in providing said instrument with means and indicia which permit its use in connection with maps of different scales and with further means which permit the direct translation of the map data into distances whatever the scale of the map which has been used.

A still further object of the invention consists in providing an instrument which permits to calculate speeds and angles affected by the prevailing wind which, as a rule, cannot be calculated independently from each other and which further permits to combine the data which have been found, immediately with those furnished by a map.

Further objects will be apparent from the following detailed specification.

The invention is illustrated in the accompanying drawing showing one embodiment thereof. It is however to be understood that this modification is merely an example shown for the purpose of explaining fully the principles on which the invention is based. This example is not the sole embodiment of the invention; other modifications are suggested to the expert skilled in the art by the following explanation and discussion of the invention and modifications of the example shown are therefore not necessarily a departure from the invention.

The invention is illustrated in the accompanying drawings in which:

Figure 1 is a front view of the calculator.

Figure 2 is a sectional view taken along line 2—2 of Figure 1.

Figure 5 is a sectional view of a detail on an enlarged scale.

Figure 3:
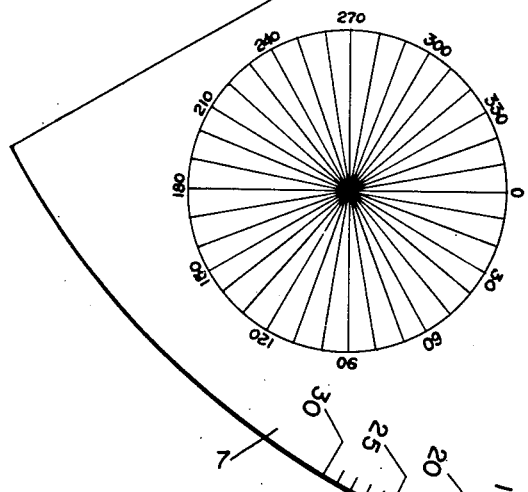
Figure 3 is a rear view of the calculator.
Figure 4:
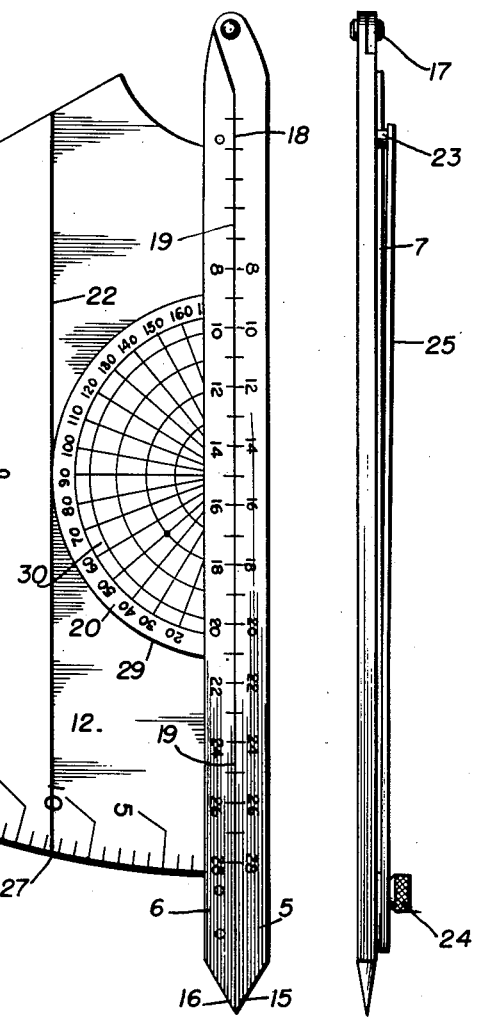
Figure 4 is an end view thereof.

A short survey of the circumstances under which the calculator is to be applied and of the nature of the calculations to be made by the pilot, his navigator or by ground personnel will contribute to the clearness of the explanation.

Most navigational problems connected with aircraft, and especially the fundamental problems, involve the construction of a speed triangle, consisting of ground speed, air speed and wind speed, which furnishes the fundamental directions which are true course, heading and wind direction, or the angles between these directions. In order to compute the fundamental data such as for instance the heading of the aircraft or angle at which it has to travel with respect to a stable reference system furnished by the compass, or the quantity of fuel to perform the flight and so forth, the navigator has to plot this triangle, starting with the air speed which he intends to hold and with the direction and speed of the wind. The construction can however not proceed directly by vectorial addition of air speed and wind speed, because only one of the vectors, the wind speed, is fully known. The data for the two other vectors are incomplete, as in the case of one of them, the ground speed, merely the direction (true course) is known and may be determined by means of the map and a reference system such as the true North. It is the direction of the geodesic line joining the point of departure and the point of destination. Of the other vector, viz. air speed, merely the intended numerical value is determined while the direction is not known. The missing data manifestly depend on the other known and unknown values, so that the triangle will ultimately provide all the values once it has been constructed.

To construct the triangle the vector representing the direction and speed of the wind is plotted, starting from a point of departure through which also a reference line passes; the direction of the true course with respect to the reference is now plotted, the numerical value of the air speed is encompassed and a circle is drawn from the end point of the vector representing the wind speed. The intersection marks the third point of the triangle. Using the same scale with which air speed and wind speed were measured, the line between the zero point of the wind speed vector and the above named point of intersection represents the value of the ground speed and the angle between the air speed and the ground speed the angle at which the plane is headed into the wind. With a known value of the ground speed and of the distance the flying time may now be calculated. Likewise, the fuel consumption and other data may be found, so that the pilot, with the above triangle is able to find all the data which are usually required by calculation.

As will be seen from the above explanation, after the speed triangle has been constructed it is necessary to introduce distances which are taken from the maps used. This is a separate operation which must be undertaken and which requires a measuring scale, tape or string, and a calculation based on the scale of the map.

These various operations which are relatively simple from a purely mathematical standpoint are nevertheless a great burden for the pilot preparing a flight and can practically not be performed by a pilot during flight who has no navigator. This is a great disadvantage as the reconstruction of the triangle and the repeating of certain calculations is repeatedly necessary for instance when winds are not found to be in conformity with the report given, or when directions have to be changed on account of the weather.

Likewise even much simplified operations such as those performed by the ground crews may be burdensome. Ground crews who have to make computations in order to be ready at the arrival or passage of a plane to provide reports, messages, etc., usually assume air speed to be equal to ground speed in order to simplify their task, but have nevertheless to perform the calculation of the time from a map furnishing the distances and they have therefore to pay attention to the scale, etc. Although their calculation is simplified, the number of calculations requires more or less elimination of all or of most computations.

The invention provides a simple calculator which is easily manipulated, may be carried in the hand and may be used directly in connection with a map so that no transmission of data is necessary. This instrument performs practically all the calculations which have been described above and requires merely a certain attention as regards the scale of the maps which are used. As a rule only three map scales are in use, one of which having a scale ten times smaller than the other.

When these maps are used the invention provides an extremely simple, light weight and easily manipulated instrument which will eliminate almost all the mental efforts connected with the computations above described and which will therefore be usable by and most useful to pilots in flight who have no navigator, and to ground personnel having to perform a large number of calculations.

The calculator consists of two spacer or divider leg members 5, 6, each provided with a point 15, 16 at the end permitting the marking or fixing of a point on a map, chart or the like. These two leg members 5, 6 are joined as usual by means of a pivot pin 17. Care is taken in this case that the fulcrum around which the two leg members are pivoting is in line with the inner edges 18, 19 of the legs which are used for calculation purposes and which are therefore provided with scales to be described below. In accordance with this construction the points 15, 16 of the leg are so arranged that they are likewise in line with the inner edges 18, 19.

One of the two leg members 5 carries a sector shaped plate 7. This sector plate projects inwardly and is fixed to the leg 5 by means of rivets, pins, screws and the like near the outer edge of the same. Near the inner edge which is covered by the sector plate 7 a channel shaped recess is provided in the leg, which preferably as seen in Figure 5 consists in a groove 8 formed between the body of the leg 5 and a small ledge 9 which projects towards the sector plate 7 but does not reach it, so that a free space exists between the end of said ledge 9 and the sector plate 7 mounted on the leg 5.

Preferably the sector shaped plate 7 is also provided with a depressed or cut portion or shallow groove 12 running straight along the inner edge 18. This depression extends outwardly and is bordered by another straight edge forming a step 22 running in parallel to the edge 18. The depression 12 is of such width that it accommodates a semi-circular protractor 20, the straight end of which is provided with a groove 21. This protractor is slidable between the leg 5 and the sector plate 7 with its groove 21 engaging the ledge 9, while the portion behind the groove and the straight edge runs in the groove 8 of the leg 5. The remainder of the protractor is held within the depression 12. It will thus be clear that the protractor although slidable is firmly held between the leg 5 and the sector plate, and can be moved easily along the inner edge 18 of the leg member 5; it will however stay in any position in which it has been brought.

The second leg 6 is provided with a transparent strip 25 held at such a distance from the leg 6 by means of bolts, screws or rivets 23 that the sector plate 7 may pass between these two members. It will thus be clear that the transparent strip 25 slides on the smooth or front side of the sector plate 7.

The transparent strip 25 is provided with a hair line 26, adapted to register with the scales provided on this side of the sector plate 7 and to be described below.

One of the means for fixing the strip may consist in a milled nut 24 cooperating with a screw projecting from leg 6 and adapted to press the strip 25 against the sector plate, so as to fix the position of the leg 6 with respect to the other leg 5 and to the sector plate 7. If, for instance, a distance between two points on a map has to be measured, the points 15, 16 of the legs are placed on the said points and the nut 24 is used to fix the legs 5 and 6 in their relative position.

The scales used for the various calculations consist of speed scales in miles per hour or other convenient units provided along the inner edges 18, 19 of the two legs 5, 6.

On the protractor 20 likewise in addition to the scale 29 showing angles, a system of concentric circles 30 permits to gauge the speed of the wind in miles per hour along the radii.

The above mentioned scales are used for determining the speed triangle and the speeds, angles, directions and other values derived from the construction of this triangle.

In addition the front part of the sector plate 7 carries a number of scales. Along the inner edge of the leg a ground speed scale in miles per hour is arranged. For each unit of this scale an arc is provided on which the time scale corresponding to this speed is marked. The arc at the bottom is subdivided to show a mile scale, giving the number of miles which corresponds to the spacing of the points 15, 16. As this number of miles encompassed between the points of the spacer differs with the scale of the map used, this scale has to be a multiple scale, made up for those map scales which are most frequently used. Only two of these scales are shown in the drawing, but it is clear that any number may be arranged; those map scales, not directly corresponding to one of the scales inscribed on the sector plate, have to be taken care of by using one of the existing scales, and dividing or multiplying the results by the required factor.

The rear side of the sector plate 7 which provides the runway for the protractor slide 20 is moreover provided with all further scales which may be required or which may be useful. It carries the angular scale 27 for measuring the angle between the two legs, a so-called compass rose for determining directions given in terms of compass readings on the instrument and other scales which may be provided for further purposes. The latter are however not shown in the drawing.

In order to provide an example of the operation of the calculator, let it be assumed that a pilot wants to use the calculator for computing the data for a flight to a point 300 miles away in a direction of 90° and that the airspeed selected is 150 M. P. H. Let it moreover be assumed that the wind speed is 30 M. P. H. and blows from 40°. The pilot in this case determines the angle for the wind speed which corresponds to the difference between true course and wind direction (as will be easily seen when the triangle is constructed) and which is 50°. On the radius of the protractor corresponding to this angle of 50° the wind speed is marked. By means of the division of the protractor radii into circles, corresponding to the wind velocity the point corresponding to the wind velocity may merely be fixed with the eye, as after a little experience no actual marking is necessary. The protractor 20 is now shifted along with leg 6 so that the point corresponding to the wind velocity coincides with the point on the scale 19 which corresponds to the selected air speed of 150 M. P. H. The ground speed can then be read immediately on leg 5 at the center point of protractor 20 on the scale 18 and the angle at which the aircraft has to head into the wind is found on the scale 27.

For further computations, as a rule, the use of a map is necessary. The pilot after having determined the ground speed sets the two points 15, 16 of the legs 5, 6 on the points on the map between which the flight has to be made. He now selects the circle corresponding to the ground speed, reads the number of miles between the said two points on the appropriate mile scale on the plate 7 and uses the hair line 26 on the strip 25 either directly (or after reduction and adjustment in the event that the scale of the map differs from the one he used) for reading the time on the circle of the ground speed which is necessary to reach the point of destination. The fuel necessary for the flight and other data may now easily be determined either in tables or by simple calculation.

The calculator may also be used in other ways by the pilot; for instance if the pilot finds two easily identifiable landmarks on the map he may determine his ground speed and find all the data he wants backwards. This is especially of advantage where the winds which are actually prevailing in the flying zone do not correspond to those which have been reported. The pilot without a navigator is, as a rule, not able to make the necessary corrections during flight.

The protractor slide may be removable so that it can be used separately for reading courses.

The maps used for aero-navigational purposes are usually drawn on three scales 1:8; 1:16; and 1:80 and it will therefore be clear that a single scale provided with suitable indications will be sufficient for all three map scales.

The calculator may be used likewise for the approximate calculations of ground personnel who have to establish radio communication or to operate signals during the passage of airplanes. In the case of such approximate calculations ground speed and air speed are identified under normal weather conditions and the manipulation is thus simplified.

It will be understood that the specific construction of the parts of the calculator is, as a rule, not a point affecting the design or the intended operation materially and changes in this respect do not therefore entail a departure from the essence of the invention.

I claim:

1. A calculator for computing airplane flight data, adapted for use in connection with maps, comprising a spacer with two pointed spacer legs provided with measuring edges, carrying flight speed scales on one side and fulcrumed at a point, aligned with both said measuring edges, a sector shaped plate, carried by one of said legs on the other side, a protractor slidable along the leg carrying the sector shaped plate with its center sliding along the measuring edge of the leg, said protractor being provided with an arcuate scale and with a radial wind speed scale for marking vectors having their point of origin on the aforesaid measuring edge, and said sector plate being provided with an angular scale, for measuring the angle enclosed between the leg along which the protractor slides and the leg passing through the end of the vector marked on the protractor.

2. A calculator for computing airplane flight data, adapted for use in connection with maps, comprising a spacer with two pointed spacer legs provided with measuring edges, and with scales arranged along the same and fulcrumed at a point, aligned with both said measuring edges, a sector shaped plate, carried by one of said legs, with the center of the sector coinciding with the point at which the legs are fulcrumed, said sector plate carrying a number of scales on its front side and an angle scale for measuring the angle between the legs at the back side, and being provided with a depressed portion along the measuring edge of one leg, a protractor slide, slidable along the back side of the sector plate and along the aforesaid measuring edge of one leg, within said depression, said protractor slide having a protractor scale arranged on said slide in a position in which its center coincides with the measuring edge along which it slides, said protractor scale being provided with angular graduations and with a series of concentric circles having their center in the protractor center for marking on it vectors having their point of departure on a point of the measuring edge.

3. A calculator for computing airplane flight data, adapted for use in connection with maps, comprising a spacer with two pointed spacer legs provided with measuring edges, and fulcrumed at a point, aligned with both said measuring edges, a sector shaped plate, carried by one of said legs, with the center of the sector corresponding with the point at which the legs are fulcrumed, said sector plate carrying a radial scale containing ground speeds, a circumferential scale containing distances and concentric circular scales containing time elements associated with the ground speed, and a member connected with one leg which is movable relatively to said sector plate for cooperation with said scales, a protractor slide, slidable along the back side of the sector plate and along the aforesaid measuring edge of one leg, said slide carrying a protractor scale the center of which coincides with the measuring edge along which it slides, said protractor scale being provided with angular graduations and with a series of concentric circles, having their center in the protractor center and adapted to mark speed vectors originating in the measuring edge of the leg along which the protractor slides.

4. A calculator for computing airplane flight data as claimed in claim 1, wherein the slidable protractor is provided with a groove and a ledge and wherein the measuring edge of the leg along which it slides is provided with a corresponding groove and ledge engaging the first named groove and ledge.

5. A calculator for computing airplane flight data adapted for use in connection with maps, comprising a spacer with two pointed spacer legs provided with speed scale carrying measuring edges, said legs being fulcrumed at a point aligned with both measuring edges, a sector shaped plate carried by one of said legs, the center of said sector being the fulcrum of the two legs, the second leg being movable relatively to the said sector, said sector plate carrying a circumferential graduation for indicating angular distance from the measuring edge of the leg to which the sector is fixed, a radial ground speed scale along one of the radial edges of the sector, a series of time scales on concentric arcs, each arc being allotted to one of the ground speed marks of the radial ground speed scale, and an arcuate circumferential distance scale, an indicator member provided with an indicator line carried by the second leg of the spacer, said indicator line cooperating with the scales on the said sector, a protractor element slidable along the spacer leg carrying the sector, and provided with a protractor scale the center of which is placed in the measuring edge of the first named leg, said protractor scale being provided with angular graduations and with a series of concentric circles having their center in the protractor center for marking on it vectors having their point of departure on a point of the measuring edge of the leg carrying the sector plate.

6. A calculator for computing airplane flight data, adapted for use in connection with maps, comprising a spacer with two pointed spacer legs provided with measuring edges carrying speed scales on one side and fulcrumed at a point aligned with both said measuring edges, a sector shaped plate carried by one of said legs on the other side, a protractor element slidable along the leg carrying the sector shaped plate, said protractor element being provided with an arcuate protractor scale and with a radial wind speed scale, so placed that the center of said scale is sliding along the measuring edge of the leg carrying the sector plate, the slidable protractor element being provided with a groove and a ledge and the measuring edge of the leg along which said protractor element slides being provided with a corresponding groove and ledge engaging the first named groove and ledge, and said sector plate being provided with an angular graduation for measuring the angle enclosed between the leg along which the protractor element slides and the second leg.

THERALD E. CODY.

REFERENCES CITED

The following references are of record in the file of this patent:

UNITED STATES PATENTS

| Number | Name | Date |
|---|---|---|
| 1,428,449 | Prall | Sept. 5, 1922 |
| 1,969,939 | Nelson | Aug. 14, 1934 |
| 2,408,357 | Wolfe | Sept. 24, 1946 |
| 2,435,606 | Sadowsky | Feb. 10, 1948 |
| 2,495,777 | Schroeder | Jan. 31, 1950 |

FOREIGN PATENTS

| Number | Country | Date |
|---|---|---|
| 135,585 | Great Britain | Nov. 26, 1919 |
| 135,646 | Great Britain | Dec. 4, 1919 |
| 278,933 | Great Britain | Oct. 20, 1927 |
| 581,732 | Great Britain | Oct. 23, 1946 |
| 840,947 | France | Jan. 28, 1939 |

OTHER REFERENCES

Article entitled "Time-Speed Dividers, Mark 1" on pages 299 and 300 of Aviation Instrument Manual, 1st American Edition, 1941, a book published by Chemical Publishing Co., Brooklyn, N. Y.